(12) United States Patent
Hanano

(10) Patent No.: US 9,930,210 B2
(45) Date of Patent: Mar. 27, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hideki Hanano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/070,632

(22) Filed: Mar. 15, 2016

(65) Prior Publication Data

US 2016/0286077 A1  Sep. 29, 2016

(30) Foreign Application Priority Data

Mar. 25, 2015  (JP) ................ 2015-063369

(51) Int. Cl.
*G06F 3/12* (2006.01)
*H04N 1/333* (2006.01)
*H04N 1/00* (2006.01)
*H04N 1/32* (2006.01)

(52) U.S. Cl.
CPC ..... *H04N 1/33376* (2013.01); *H04N 1/00408* (2013.01); *H04N 1/00477* (2013.01); *H04N 1/00814* (2013.01); *H04N 1/00896* (2013.01); *H04N 1/32667* (2013.01); *H04N 2201/0094* (2013.01)

(58) Field of Classification Search
CPC ........... H04N 1/33376; H04N 1/00896; H04N 1/00408; H04N 1/00814; H04N 1/32667; H04N 1/00477

USPC ........................................... 358/1.13
See application file for complete search history.

(56) References Cited

U.S. PATENT DOCUMENTS

| | | | |
|---|---|---|---|
| 8,291,262 B2 | 10/2012 | Tsujimoto | ........................ 714/18 |
| 8,508,769 B2 * | 8/2013 | Matsuzawa | ............. G06F 3/121 358/1.14 |
| 2004/0145776 A1 * | 7/2004 | Azami | ............... H04N 1/00395 358/1.15 |
| 2012/0327482 A1 * | 12/2012 | Takishima | ......... H04N 1/32037 358/402 |
| 2013/0155458 A1 * | 6/2013 | Kanakubo | ............. G06F 3/1204 358/1.15 |

(Continued)

FOREIGN PATENT DOCUMENTS

JP  2011-15131 A  1/2011

*Primary Examiner* — Neil R McLean
(74) *Attorney, Agent, or Firm* — Fitzpatrick, Cella, Harper & Scinto

(57) ABSTRACT

An information processing apparatus having a power-saving standby power mode, according to an embodiment of the present invention, first communicates with an image reading device configured to read an image from an original and receives image data obtained in the reading of the image. In a case where a reading operation does not normally terminate because the information processing apparatus changes to a power-saving state during the reading operation and it is confirmed that the image processing apparatus has returned from the power-saving state, the information processing apparatus instructs the image reading device to discard the received image data of an image that was being read from an original when the information processing apparatus shifted to the power-saving state, and re-read the image that was being read from the original.

15 Claims, 12 Drawing Sheets

(56) References Cited

U.S. PATENT DOCUMENTS

| | | | |
|---|---|---|---|
| 2014/0153026 A1* | 6/2014 | Poole | B41J 29/393 358/1.14 |
| 2015/0043031 A1* | 2/2015 | Oguma | G06F 3/1207 358/1.15 |
| 2015/0262050 A1* | 9/2015 | Kitora | G06K 15/4055 358/1.13 |

* cited by examiner

FIG. 6

RE-SCANNING ORIGINAL THAT WAS BEING READ BEFORE
SHIFT TO SLEEP STATE. PLEASE WAIT.

FIG. 7

UNABLE TO COMMUNICATE WITH SCANNER DUE TO
FOLLOWING REASONS:

-SCANNER IS NOT POWERED ON.

-USB CABLE IS NOT CORRECTLY CONNECTED.

PLEASE CHECK AND TRY AGAIN.

OK

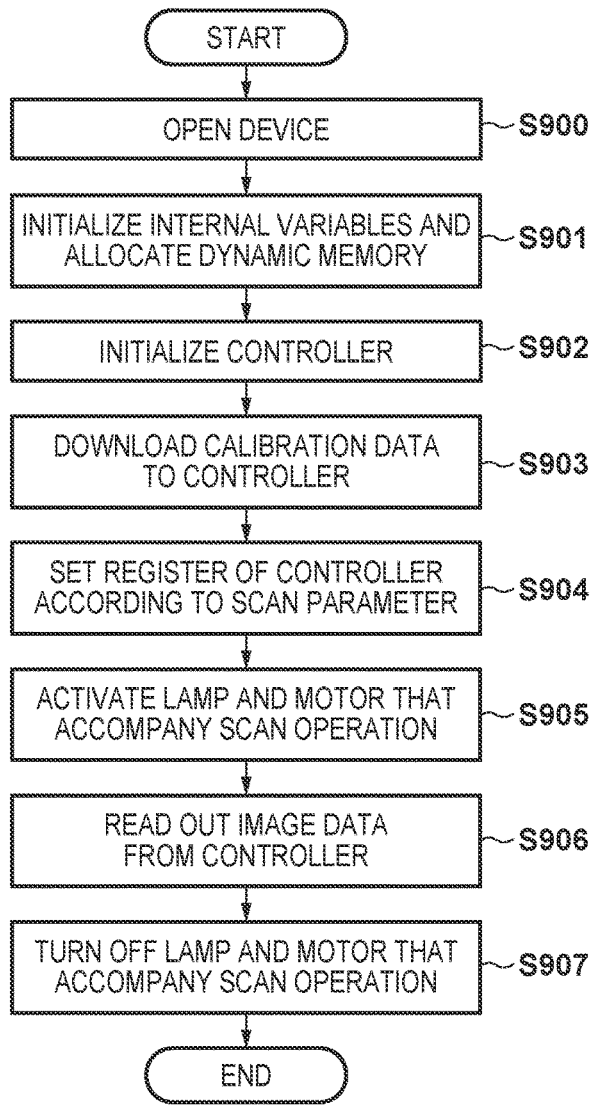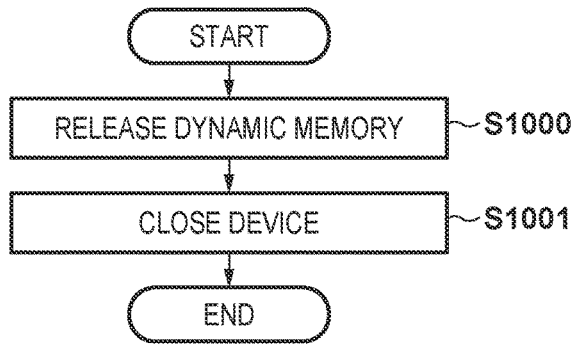

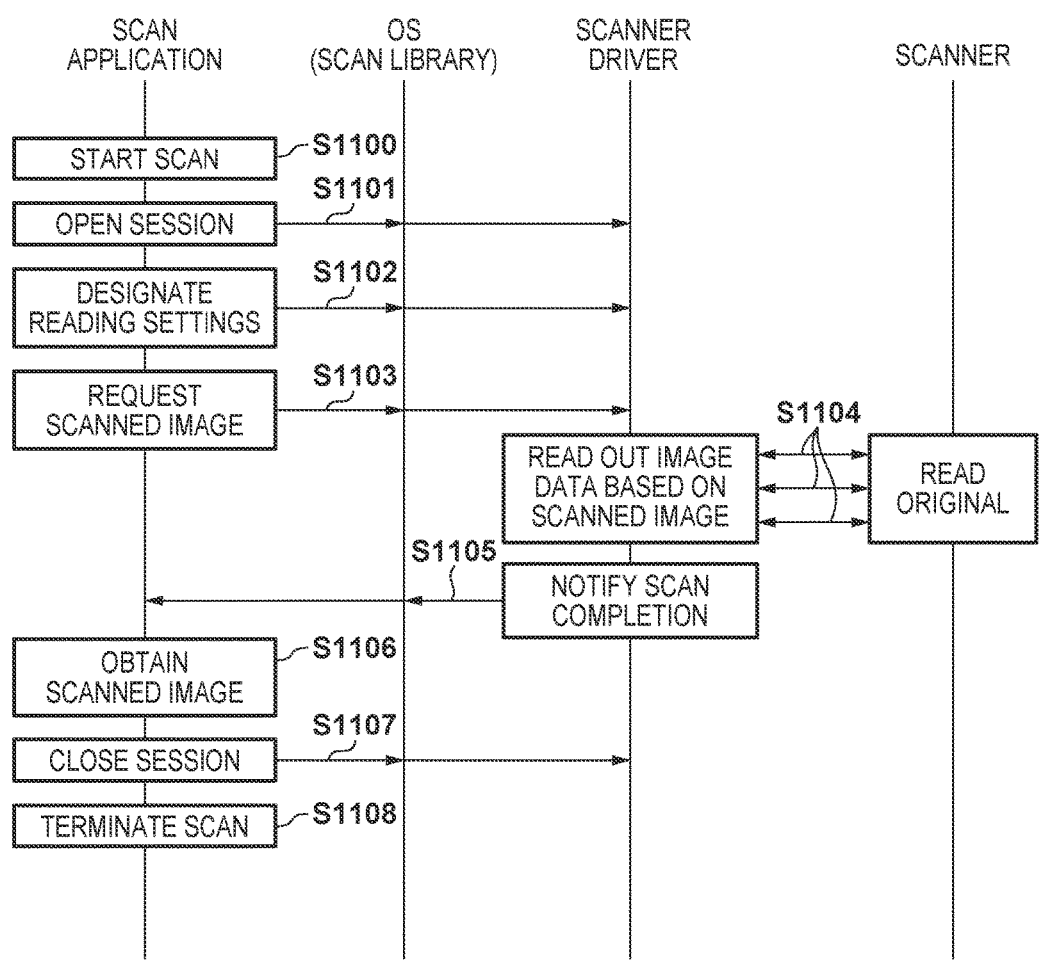

F I G. 12B
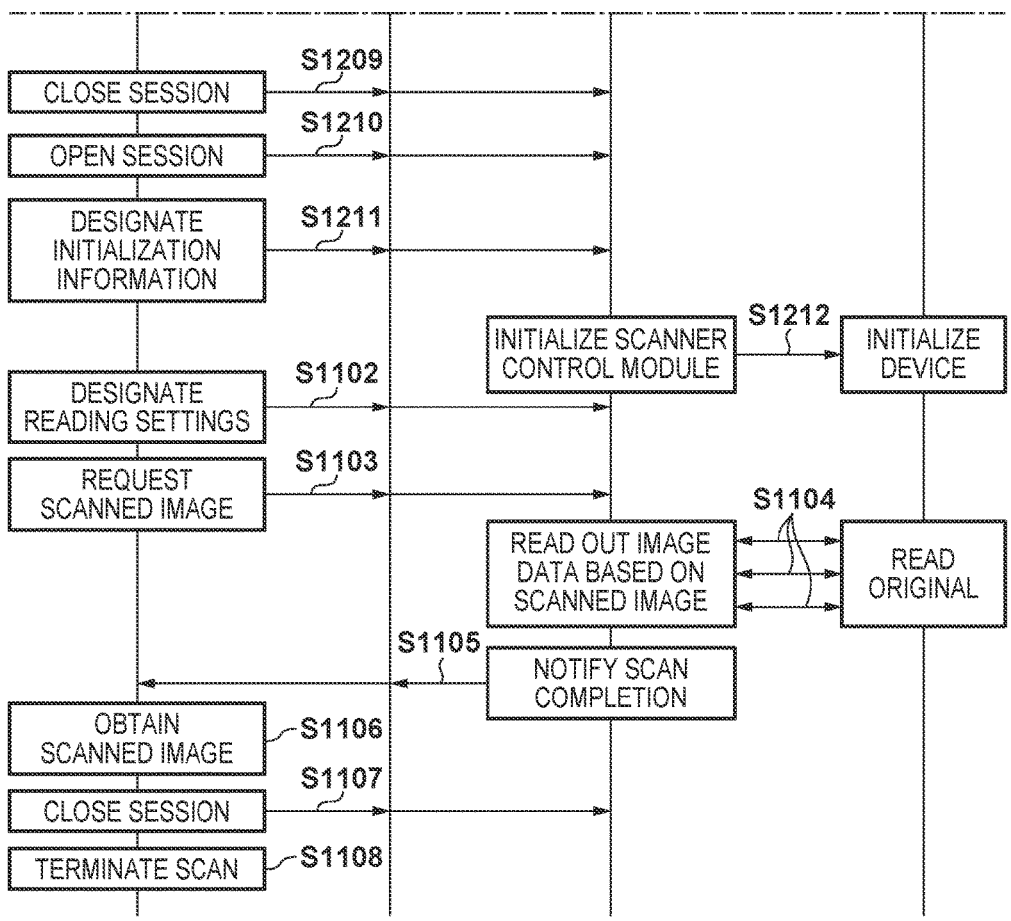

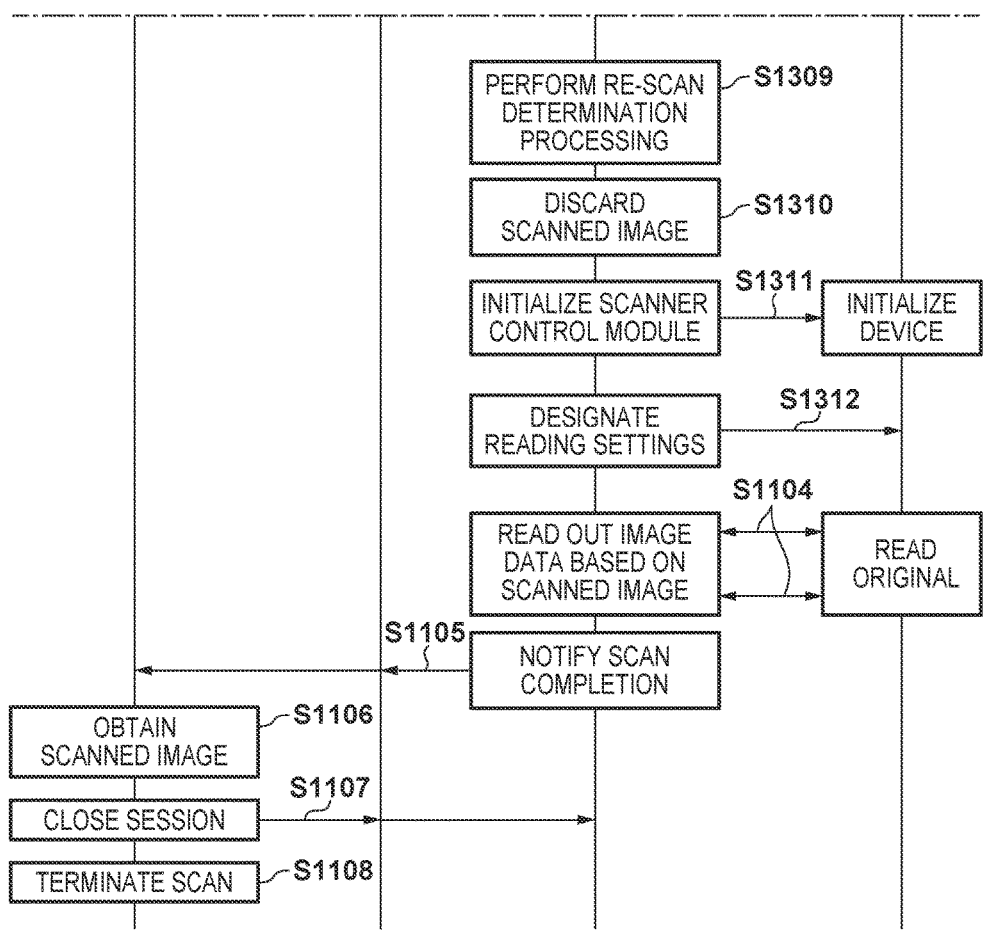
F I G. 13B

INFORMATION PROCESSING APPARATUS, INFORMATION PROCESSING METHOD, AND STORAGE MEDIUM

BACKGROUND OF THE INVENTION

Field of the Invention

The present invention relates to an image processing technique for generating a file of image data read from an image reading device by an application of an information processing apparatus.

Description of the Related Art

The following kinds of software are necessary for saving image data, which has been read from an image reading device such as a scanner or a multi-function printer (MFP), in an information processing apparatus. The first kind of software is a scanner driver that controls the image reading device, and the second kind of software is an application that receives image data from the scanner driver and saves the received image data as a file. Generally, the scanner driver conforms to a specification such as TWAIN (Technology Without An Interesting Name) or WIA (Windows Image Acquisition).

In a case where the application of the information processing apparatus reads, via the scanner driver, a plurality of originals placed on an original table of the image reading device, reading of a desired number of originals is performed after a user confirms a message about the completion of the next original reading preparation. A multi-page file is generated in this manner. For example, in a case where an error such as a paper jam occurs when the image reading device is reading a plurality of originals, Japanese Patent Laid-Open No. 2011-015131 discloses a technique that uses already read image data to efficiently transmit image information by notifying the user of the error and prompting the user to perform a recovery operation.

In recent years, information processing apparatus models that are designed to be conscious of power saving and energy saving have become popular. Particularly, an information processing apparatus such as a notebook PC or a smart device often shifts to a sleep state when the cover is closed or it is not used for a predetermined period of time. Therefore, if the information processing apparatus shifts to the sleep state when an application of the information processing apparatus is generating a multi-page file by reading a plurality of originals by the image reading device, an error notification related to the image reading operation is made from the scanner driver after the information processing apparatus returns from the sleep state. As a result, the application generates an image data file based on the already read originals and terminates the image reading processing after notifying the user of the occurrence of the error. This is not user-friendly as it requires the user to manually operate and perform processing to combine a plurality of pages into a single file upon performing the original reading operation again from the error page.

Additionally, although image data based on the already read originals are combined and transmitted to the information processing apparatus in the technique disclosed in Japanese Patent Laid-Open No. 2011-015131, the technique is very cumbersome as it requires the user to perform a recovery operation on the screen which notified the user of the occurrence of the error.

SUMMARY OF THE INVENTION

Accordingly, the present invention is conceived as a response to the above-described disadvantages of the conventional art.

For example, an information processing apparatus, an information processing method, and a storage medium according to this invention are capable of automatically continuing, when the information processing apparatus has changed to a power-saving state while reading an original by an image reading device, the reading processing which was operating before the shift to the power-saving state after returning to a normal state.

According to one aspect of the present invention, there is provided an information processing apparatus that has a power-saving standby power mode, comprising: a communication unit configured to communicate with an image reading device configured to read an image from an original; and an instruction unit configured to instruct the image reading device via the communication unit, in a case where a reading operation does not normally terminate because the information processing apparatus changes to a power-saving state during the reading operation and it is confirmed that the information processing apparatus has returned from the power-saving state, to discard image data of an image which was being read from an original when the information processing apparatus shifted to the power-saving state and re-read the image which was being read from the original.

According to another aspect of the present invention, there is provided an information processing method of an information processing apparatus that includes a power-saving standby power mode, comprising: communicating with an image reading device configured to read an image from an original and receiving image data obtained in the reading of the image; and instructing the image reading device, in a case where a reading operation does not normally terminate because the information processing apparatus changes to a power-saving state during the reading operation and it is confirmed that the information processing apparatus has returned from the power-saving state, to discard the received image data of an image which was being read from an original when the information processing apparatus shifted to the power-saving state, and re-read the image which was being read from the original.

According to still another aspect of the present invention, there is provided a non-transitory computer readable storage medium which stores a computer program to be executed in a processor of an information processing apparatus that has a power-saving standby power mode, the program comprising the above steps recited in the above information processing method.

The invention is particularly advantageous since it has an effect that the reading processing which was operating before the shift to the power-saving state can be automatically continued without error termination even when the information processing apparatus returns from the power-saving state while reading the original by the image reading device. This can improve user convenience.

Further features of the present invention will become apparent from the following description of exemplary embodiments (with reference to the attached drawings).

BRIEF DESCRIPTION OF THE DRAWINGS

FIG. 6 is a view showing an example of a progress screen.

FIG. 7 is a view showing an example of a communication error dialogue box.

FIG. 9 is a flowchart showing scan processing.

FIG. 10 is a flowchart showing termination processing executed by a scanner control module.

FIG. 11 is a sequence chart showing processing for obtaining image data.

FIGS. 12A and 12B are sequence charts showing processing for automatically restarting an original reading operation.

FIGS. 13A and 13B are sequence charts for automatically restarting scan processing.

DESCRIPTION OF THE EMBODIMENTS

Figure 1:
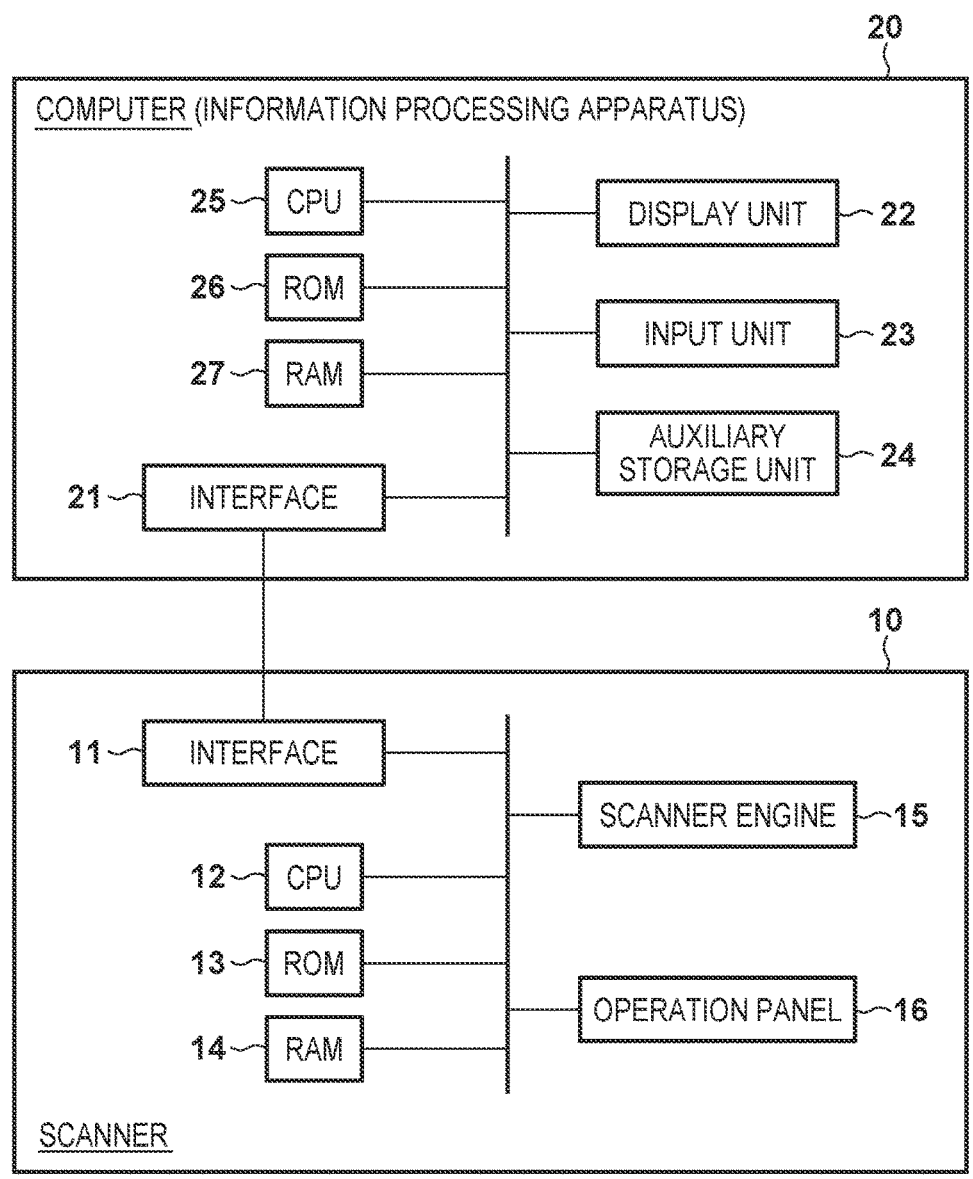
FIG. 1 is a block diagram showing an example of the arrangement of an information processing system.

Exemplary embodiments of the present invention will now be described in detail in accordance with the accompanying drawings. Note that the same reference numerals denote already explained portions, and a repetitive description will be omitted.

First, the arrangement of an information processing system which is formed from a scanner and a computer and used as a common embodiment of the examples according to the present invention will be described.

FIG. 1 is a block diagram showing an example of the arrangement of an information processing system which is an exemplary embodiment of the present invention. A scanner 10 and a computer (image processing apparatus) 20 are connected to each other via a USB interface in this information processing system. The computer 20 plays the role of an information processing apparatus that transmits various kinds of control commands interpretable by the scanner 10 and receives image data read according the control commands by the scanner 10. The scanner 10 plays the role of an image reading device that generates image data by reading an original based on control from the computer 20 and transmits the generated image data to the computer 20.

The computer 20 includes, as hardware components, an interface 21, a display unit 22, an input unit 23, an auxiliary storage unit 24, a CPU 25, a ROM 26, and a RAM 27. The interface 21 controls exchange of data with a peripheral such as the scanner 10 in accordance with a protocol conforming to a USB specification. The display unit 22 is implemented by, for example, an LCD display or the like, and displays various kinds of user interfaces (to be referred to as UIs hereinafter) screens. The input unit 23 is implemented by, for example, a keyboard, a pointing device, and the like, and inputs instructions from the user in the apparatus. The auxiliary storage unit 24 is implemented by an integrated or external hard disk, a semiconductor storage device (SSD) or the like, and stores various kinds of information. The ROM 26 stores various kinds of programs, and the RAM 27 temporarily stores data and programs. The CPU 25 supervises and controls the computer 20 by executing a program read out from the ROM 26 while using the RAM 27 as a work area.

The scanner 10 is, for example, a CCD color image scanner. The CCD color image scanner optically reads an original placed on an original table by scanning a CCD line sensor (not shown) and converts the read original into image data. A CIS scanner can also be used as a color image scanner.

The scanner 10 has, as its hardware components, an interface 11, a CPU 12, a ROM 13, a RAM 14, a scanner engine 15, and an operation panel 16. The interface 11 controls the exchange of data with an information processing apparatus such as the computer 20. The ROM 13 stores various kinds of programs, and the RAM 14 temporarily stores data and programs. The CPU 12 supervises and controls the scanner 10 by executing a program read out from the ROM 13 while using the RAM 14 as a work area. The scanner engine 15 controls an original reading unit equipped with a CCD color image sensor or the like. The operation panel 16 is formed from an LED lamp, a display for displaying the status of the image reading device or a menu, and an input unit such as a button or a key for inputting instructions from the user to the apparatus.

Some embodiments of original reading processing executed by using the information processing system with the above-described arrangement will be described next.

First Embodiment

Figure 2:
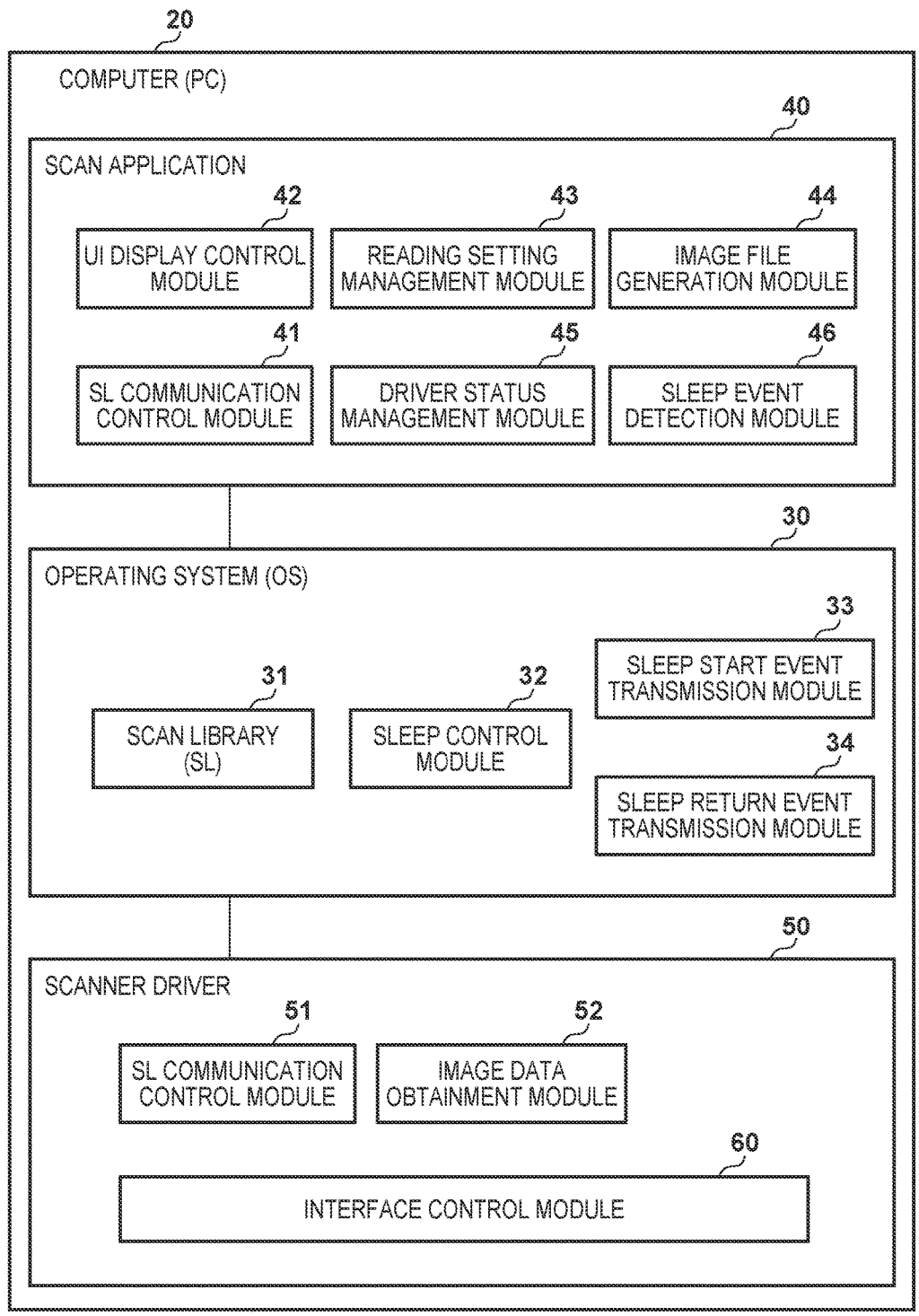
FIG. 2 is a block diagram showing an example of the functional configuration of software.

FIG. 2 is a block diagram showing an example of the functional configuration of software installed in and executed by a computer 20. Each functional portion shown in FIG. 2 is implemented by, for example, a CPU 25 reading out and executing a program stored (that is, installed) in a ROM 26 or an auxiliary storage unit 24 while using a RAM 27 as a work area. The functional configuration to be implemented by the computer 20 can be broadly divided into a scan application 40, an operating system (OS) 30, and a scanner driver 50 each conforming to a predetermined image communication specification.

The OS 30 manages the overall computer by providing, to many applications, basic functions such as an input/output function which controls outputs to a display unit 22 and inputs from an input unit 23, a memory management function of the auxiliary storage unit 24, and the like. The OS 30 also includes a scan library (SL) 31 which controls the scan application 40 and the scanner driver 50. The scan library 31 provides an API (Application Program Interface) that implements communication with the scan application 40 and the scanner driver 50 conforming to a predetermined image communication specification. The OS 30 further includes a sleep control module 32, a sleep start event transmission module 33, and a sleep return event transmission module 34.

The sleep control module 32 controls whether the computer 20 will shift to a sleep state as the power-saving standby power mode. If there is no UI operation after a preset time has elapsed or if the cover is shut in a case where the computer 20 is a notebook-type PC, the computer 20 automatically shifts to the sleep state by the control of the sleep control module 32. The sleep start event transmission module 33 transmits a sleep start event to each active application including the scan application 40 immediately before shifting to the sleep state. In a similar manner, the sleep return event transmission module 34 transmits a sleep return event to each active application upon returning from the sleep state and shifting to a normal activation state.

The scan application 40 is software that processes image data, and includes, for example, image data editing software and image data character recognition software. The scan application 40 includes an SL communication control module 41, a UI display control module 42, a reading setting management module 43, an image file generation module 44, a driver status management module 45, and a sleep event detection module 46. The SL communication control module 41 obtains, via the scan library (SL) 31, image data from the scanner driver 50 conforming to a predetermined image communication specification. The SL communication control module 41 notifies the driver status management module 45 about error information and status information of the scanner driver 50 notified from the scan library 31.

The UI display control module 42 appropriately executes display control of various setting screens for executing an image reading operation and screens for displaying the state of the scanner 10. The reading setting management module 43 stores and manages previous and current settings in the reading settings for executing the image reading operation. The image file generation module 44 stores, in the auxiliary storage unit 24, image data obtained from the scanner driver 50 as an image file in a data format such as JPEG, PDF, TIFF, or the like. The driver status management module 45 manages the latest status information by storing the error information and status information notified from the SL communication control module 41. The sleep event detection module 46 detects a printer event issued from the OS 30 when the computer 20 shifts to the sleep state or returns from the sleep state. Note that the sleep state of the computer 20 is a power-saving state in which the power consumption is set smaller than the normal operation state of the computer 20. More specifically, reduction of consumed power can be implemented by stopping power supply to the display unit and input unit of the computer 20.

The scanner driver 50 transmits commands to control the scanner 10 and receives image data and data representing the state of the scanner 10. Note that the transmission of a command and the reception of image data are performed via an interface control module 60. The scanner driver 50 also includes an SL communication control module 51 and an image data obtainment module 52. The SL communication control module 51 exchanges commands, conforming to a predetermined image communication specification, with the scan application 40 via the scan library (SL) 31. The SL communication control module 51 accepts settings such as color mode, resolution, original size, and the like as scan settings. The image data obtainment module 52 obtains, via the interface control module 60, image data generated by reading an original by the scanner 10 and stores the obtained image data in a memory (for example, the RAM 27).

Figure 3:
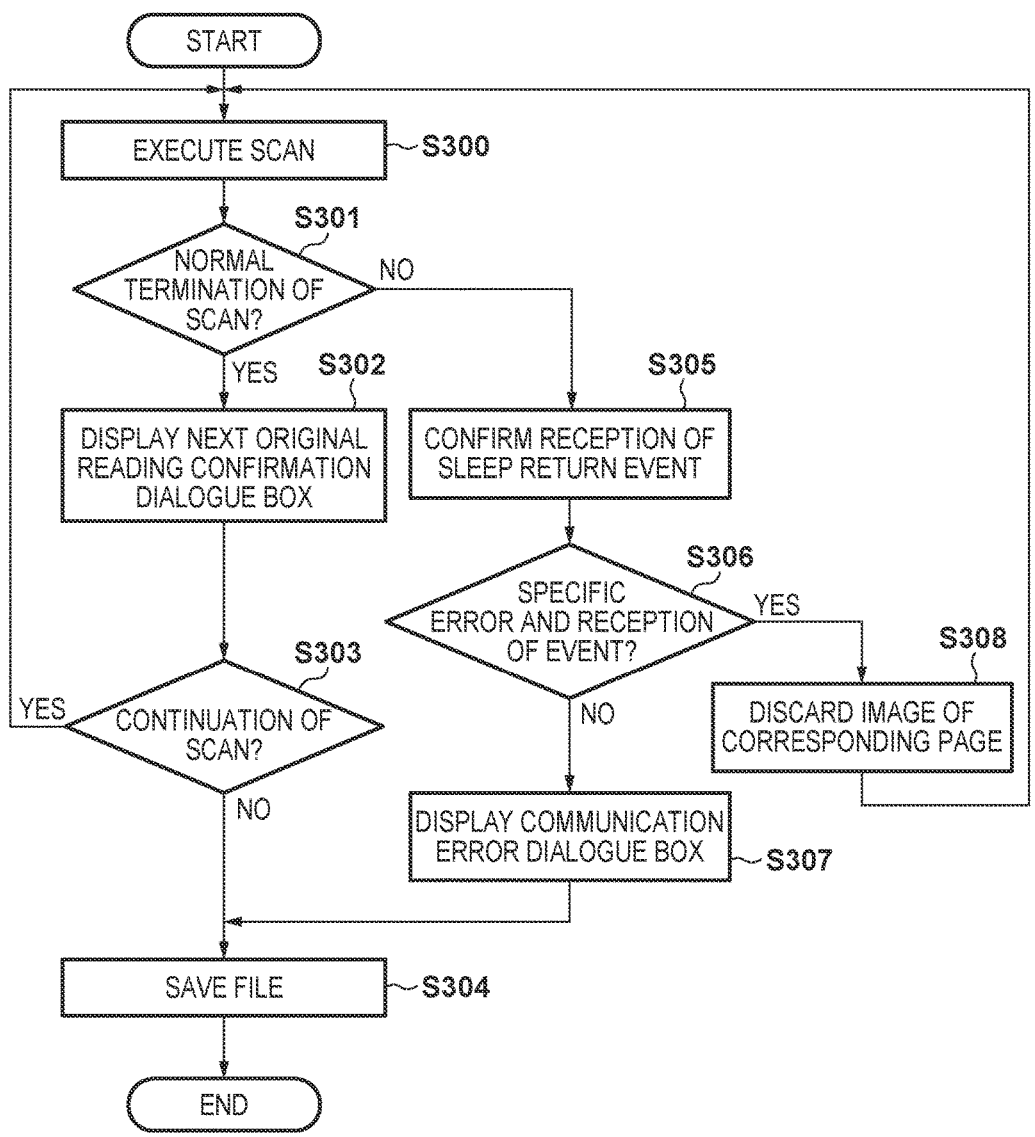
FIG. 3 is a flowchart showing processing for generating a multi-page image file.

FIG. 3 is a flowchart showing processing for generating and saving a multi-page image file by sequentially reading a plurality of originals using the scanner 10. Note that the flowchart of FIG. 3 is implemented by the CPU reading out and executing a program related to the scan application 40.

Figure 4:
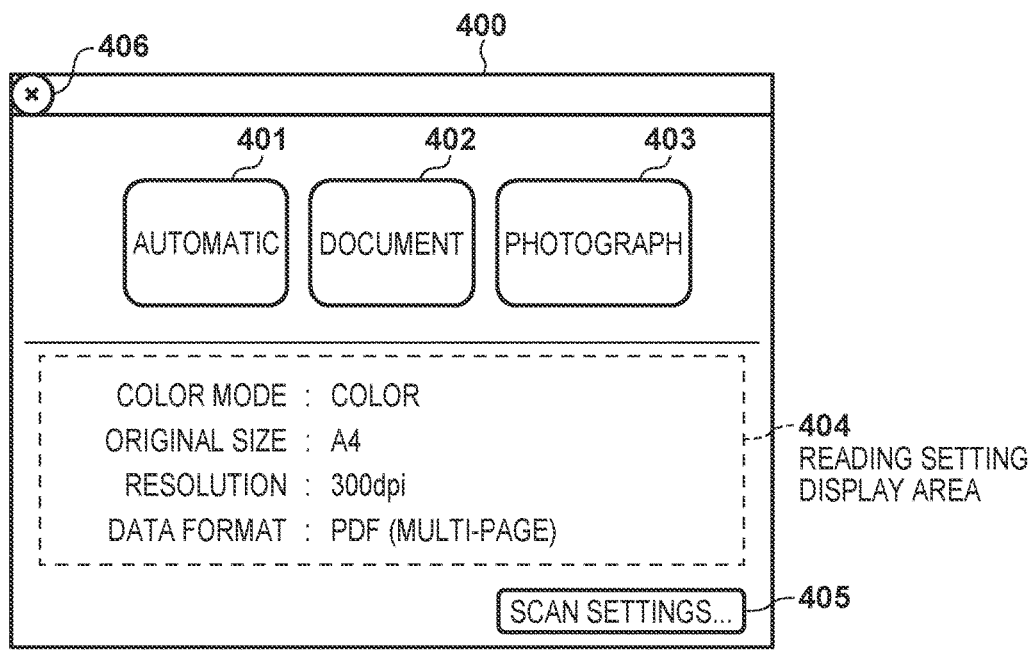
FIG. 4 is a view showing an initial screen of a scan application.

FIG. 4 is a view showing the initial screen of the scan application 40 that is displayed when the scan application 40 is activated by a user.

As shown in FIG. 4, a main dialogue box 400 of the initial screen is formed from buttons 401 to 403 for executing a scan, a reading setting display area 404, and a scan setting button 405. The buttons 401 to 403 for executing a scan are provided for user selection and instruction. When the user selects one of these buttons, scan settings associated with the selected button are displayed on the reading setting display area 404, and the user can confirm the setting contents. The setting contents have been appropriately preset in accordance with the type of the original such as a document or a photograph. The user can, however, change the setting contents such as the color mode, original size, resolution, data format, and the like by using the scan setting dialogue box (not shown) displayed upon pressing or clicking the scan setting button 405.

When the user presses or clicks a button 406, the main dialogue box 400 is closed and the scan application 40 is terminated.

The description of the processing begins by referring back to FIG. 3. When one of the buttons 401 to 403 shown in FIG. 4 is pressed, the CPU 25 transmits a scan command to a peripheral to cause the peripheral to execute the scan operation in step S300. Then, the CPU 25 uses the scan application 40 to obtain image data based on the above scan command from the scanner driver 50 via the scan library 31.

In step S301, the CPU 25 makes an error occurrence inquiry to the driver status management module 45 of the scan application 40 and checks if the scan has been terminated normally. If it is determined that the scan has been terminated normally (YES in step S301), the process advances to step S302 and the CPU 25 displays a next original reading confirmation dialogue box 500.

Figure 5:
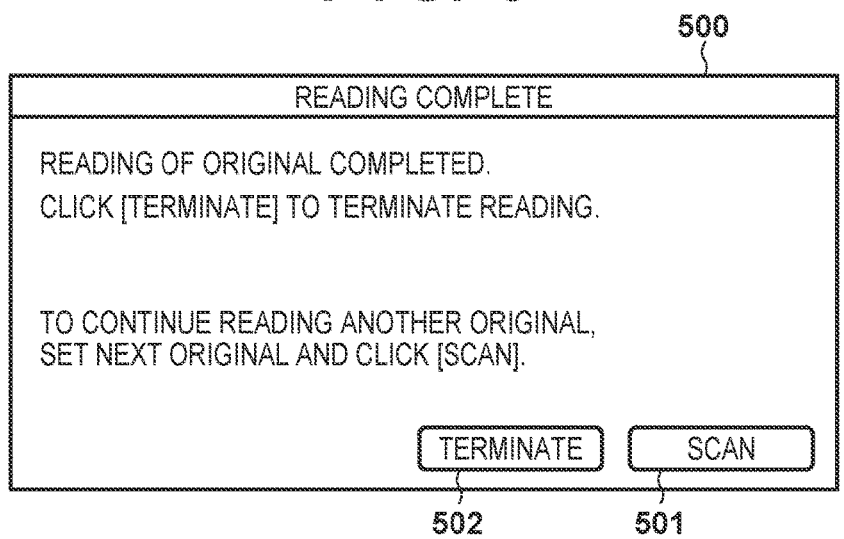
FIG. 5 is a view showing a next original reading confirmation dialogue box.

FIG. 5 is a view showing the next original reading confirmation dialogue box 500.

The next original reading confirmation dialogue box 500 is formed from a display screen showing a scan button 501, a termination button 502, and a message informing the user of the state of the scan operation and prompting him/her to select the next operation as shown in FIG. 5.

In step S303, the CPU 25 determines whether to continue the scan in accordance with the button selected by the user in FIG. 5. If the scan button 501 is pressed or clicked, continuation of the scan is determined (YES in step S303), and the process returns to step S300 to start the reading of another original. As indicated in FIG. 5, the computer 20 can continuously read a plurality of originals to generate a single multi-page image data file by continuing the scan. In contrast, if the termination button 502 is pressed or clicked, it is determined that termination of the scan has been instructed (NO in step S303), and the process advances to step S304 and the CPU 25 saves the already read image data in a file of a designated data format. For example, if the data format is designated to be a multi-page PDF or a multi-page TIFF, a single multi-page file is generated.

In contrast, if it is determined that the scan operation has not been terminated normally in step S301 (NO in step S301), the process advances to step S305. A situation where "NO" can be determined in step S301 is, for example, a situation where the computer 20 is unable to communicate with the scanner 10 upon shifting to the sleep state and an error termination occurs because the reading operation cannot be restarted from the previous reading state even after the computer has returned from the sleep state. In step S305, the CPU 25 uses the sleep event detection module 46 to confirm whether a sleep state return event has been received from the OS 30.

Next, in step S306, the CPU 25 checks whether the error obtained using the driver status management module 45 is a specific error such as a reading failure and whether a sleep state return event has been received. If the CPU 25 determines that the obtained error is a specific error as described above and that the return event has been received (YES in step S306), the process advances to step S308 to discard the image data of the page in which the error occurred. The CPU 25 has recognized which page it instructed the scan processing at the time of the instruction of scan execution in step S300. Therefore, the page in which the error has occurred can be specified and the image data of the specified page can be discarded in step S308. Subsequently, the process returns to step S300, and the CPU 25 instructs the peripheral to execute a scan of the page in which the error has occurred. Note that the instruction issued at this time instructs the peripheral to execute the scan by the same scan settings as in the previous scan operation. In this manner, the original page in which the error occurred is read automatically without having to accept any special operation from the user.

Note that a progress screen showing the progress of the reading operation can be displayed on the display unit 22 of the computer or an operation panel 16 of the scanner 10 to notify the user that the computer 20 is re-reading, after returning from the sleep state, the original that the computer was in the middle of reading before it had shifted to the sleep state.

FIG. 6 is a view showing an example of the progress screen to be displayed on the display unit 22 of the computer 20 or the operation panel 16 of the scanner 10.

If it is determined that the obtained error is not the above-described specific error or that a return event has not been received in step S306 (NO in step S306), the process advances to step S307. Note that a case where "NO" can be determined in step S306 is, for example, a case where some kind of error has occurred during the scan processing in a situation where the computer has not shifted to the sleep state. In step S307, the CPU 25 displays a communication error dialogue box. Further, in step S304, image data based on the already read images is saved as a file of a designated data format.

FIG. 7 is a view showing an example of the communication error dialogue box.

Note that, in step S307, the CPU 25 advances the process to step S304 upon recognizing that the user has pressed or clicked the "OK" button shown in FIG. 7. The file created by advancing from "NO" in step S306 to steps S307 and S304 becomes a file that includes image data up till the preceding page of the page in which the error had occurred.

According to the processing of the flowchart of FIG. 3, the CPU 25 uses the scan application 40 to determine whether to discard the image data of the error page, based on the error information obtained from the scanner driver 50 after receiving a sleep state return event. However, the present invention is not limited to this. The CPU 25 can always discard the image data of the error page without determining whether the obtained error is a specific error and execute the scan operation by the same settings as in the previous scan operation.

Although an arrangement in which a pull scan instruction is performed through the scan screen displayed on the display unit 22 by executing the scan application 40 was described as an example of executing the scan operation in step S300, the present invention is not limited to this. For example, it can have a pseudo push scan arrangement in which scan instruction is performed from the operation panel 16 of the scanner 10 and the computer 20 requests image data from the scanner 10 upon receiving that instruction.

Therefore, according to the above-described first embodiment, since no error termination occurs even if the scan application of the computer returns from the sleep state while the scanner is reading an original and the reading processing which was operating before the shift to the sleep state can automatically continue, user convenience can be improved.

Second Embodiment

An example of an image reading operation in a case where a scanner 10 of an information processing system is a USB-powered device and operated by power supply from a computer 20 via a USB interface will be described. Note that each screen to be used as a user interface (UI) and the multi-page file saving processing executed by a scan application 40 according to the second embodiment are the same as those described with reference to FIGS. 3 to 7 in the first embodiment, and a description thereof will be omitted.

Figure 8:
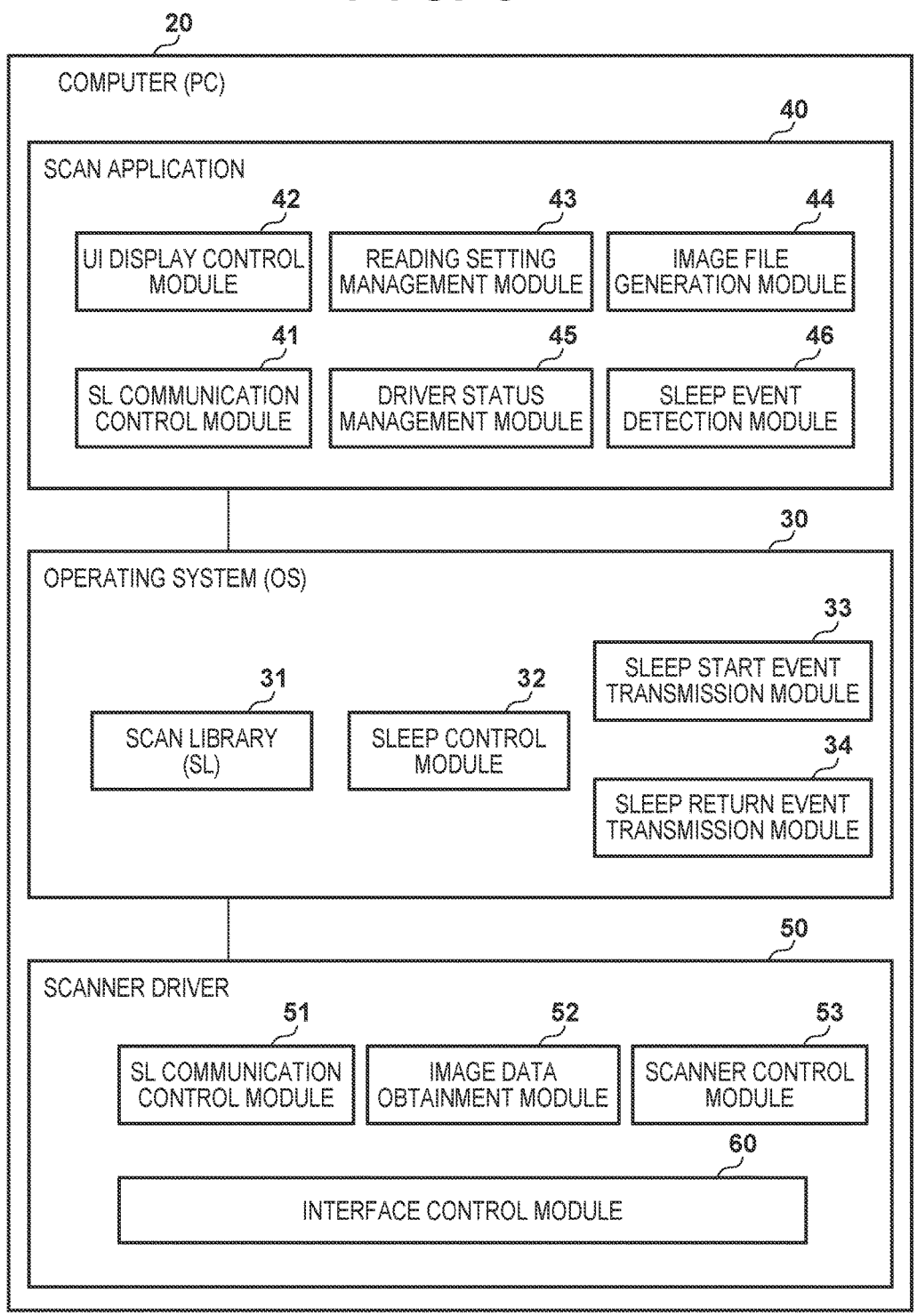
FIG. 8 is a block diagram showing an example of the functional configuration of software.

FIG. 8 is a block diagram showing an example of the functional configuration of software to be installed in and executed by the computer 20. Note that, in the functional configuration shown in FIG. 8, an OS 30 and the scan application 40 are the same as those described with reference to FIG. 2 in the first embodiment, and a description thereof will be omitted.

A scanner driver 50 includes an SL communication control module 51, an image data obtainment module 52, and a scanner control module 53. The SL communication control module 51 exchanges commands, conforming to a predetermined image communication specification, with the scan application 40 via a scan library (SL) 31. Settings such as a color mode, resolution, original size, and the like are accepted as scan settings. The image data obtainment module 52 obtains, via an interface control module 60, image data obtained from reading an original by the scanner 10 and stores the obtained image data in a memory (for example, a RAM 27).

The scanner control module 53 directly controls a controller (not shown) that supervises a scanner engine 15 of the scanner 10 which is a USB-powered device and performs device initialization processing and image data reading processing.

FIG. 9 is a flowchart showing scan processing of the scanner control module which is performed in response to a scan operation executed after the scanner driver is activated. That is, the flowchart of FIG. 9 is executed when a CPU 25 reads out and executes a program related to the scanner driver 50.

In step S900, the CPU 25 uses the scanner control module 53 to open an I/O path to the scanner 10 in response to the activation of the scanner driver 50. For example, the OS 30 activates the scanner driver 50 of the device when a USB plug & play occurs. Then, after performing initialization of various internal variables, dynamic memory allocation processing, and the like in step S901, the CPU 25 performs initialization processing of the controller of the scanner 10 in step S902.

In step S903, if there is a scan request from the scan application 40, the CPU 25 reads out calibration data from a calibration file and downloads the data to the controller of the scanner 10. Consequently, the brightness of the illumination lamp for image reading and the sensitivities of various image sensors of the scanner 10 are set to appropriate states. Next in step S904, the CPU 25 sets various registers of the controller of the scanner 10 according to the scan parameters set by the scan application 40.

Subsequently, in step S905, the CPU 25 activates the lamp and motor accompanying the scan operation and causes the scanner 10 to perform reading of the original. In step S906, the CPU 25 obtains image data from the controller of the scanner 10. Then in step S907, when image data obtainment is completed, the CPU 25 turns off the lamp and stops the drive of the motor used in the scan operation and instructs execution of processing such as processing to move a carriage equipped with a color image scanner to the home position.

FIG. 10 is a flowchart showing termination processing executed by the scanner control module 53 when the operation of the scanner driver is terminated. That is, the flowchart of FIG. 10 is executed by the CPU 25 reading out and executing a program related to the scanner driver 50.

In step S1000, at the time of operation termination of the scanner driver 50, the CPU 25 performs release processing of the dynamic memory allocated in step S901. Then, in step S1001, the I/O path to the scanner 10 is closed. For example, the OS 30 terminates the scanner driver 50 of the device when the USB cable connected to the computer 20 is pulled out or the power of the device is turned off.

In this manner, the control of the scanner 10 which operates as a USB-powered device is closely related to the scanner control module 53 of the scanner driver 50. Therefore, since power supply to the scanner 10 will be stopped if the computer 20 shifts to the sleep state, it is necessary to initialize the scanner control module 53 to control the scanner again.

FIG. 11 is a sequence chart showing processing in which the CPU 25 uses the scanner application 40, the scan library 31, and the scanner driver 50 to obtain image data obtained from the scanner.

In step S1100, when start of scan is instructed from an initial screen as shown in FIG. 4, the CPU 25 uses the scan application 40 to execute processing for starting the scan. Next, in step S1101, the CPU 25 opens a session to establish communication with the scanner driver 50 corresponding to the USB-connected scanner 10. Further, in step S1102, the CPU 25 designates, to the scanner driver 50, reading conditions such as the color mode, resolution, original size, and the like designated in the initial screen shown in FIG. 4. Then, in step S1103, the CPU 25 requests obtainment of image data based on the scanned images obtained by reading the original.

In step S1104, the CPU 25 uses the scanner driver 50 to instruct the scanner to execute the scan processing and perform image data readout from the scanner 10. Upon completing readout of all the image data, the CPU 25 uses the scanner driver 50 to notify the scan application 40 of scan completion in step S1105. In step S1106, upon receiving the scan completion notification, the CPU 25 obtains the image data based on the scanned images by a pre-designated transfer method according to a predetermined image communication specification. For example, in the case of a file transfer method, the CPU 25 accepts an image file stored in a folder designated by the scan application 40. Alternatively, in the case of a memory transfer method, the CPU 25 receives image data in block units on a memory allocated by the scan application 40. In this case, upon completing readout of block unit image data, a block unit scan completion notification can be transmitted to the scan application 40 from the scanner driver 50.

When image data obtainment is completed, the CPU 25 closes the session established in step S1101 by using the scan application 40 in step S1107 and terminates the scan processing in step S1108.

Figure 12A:
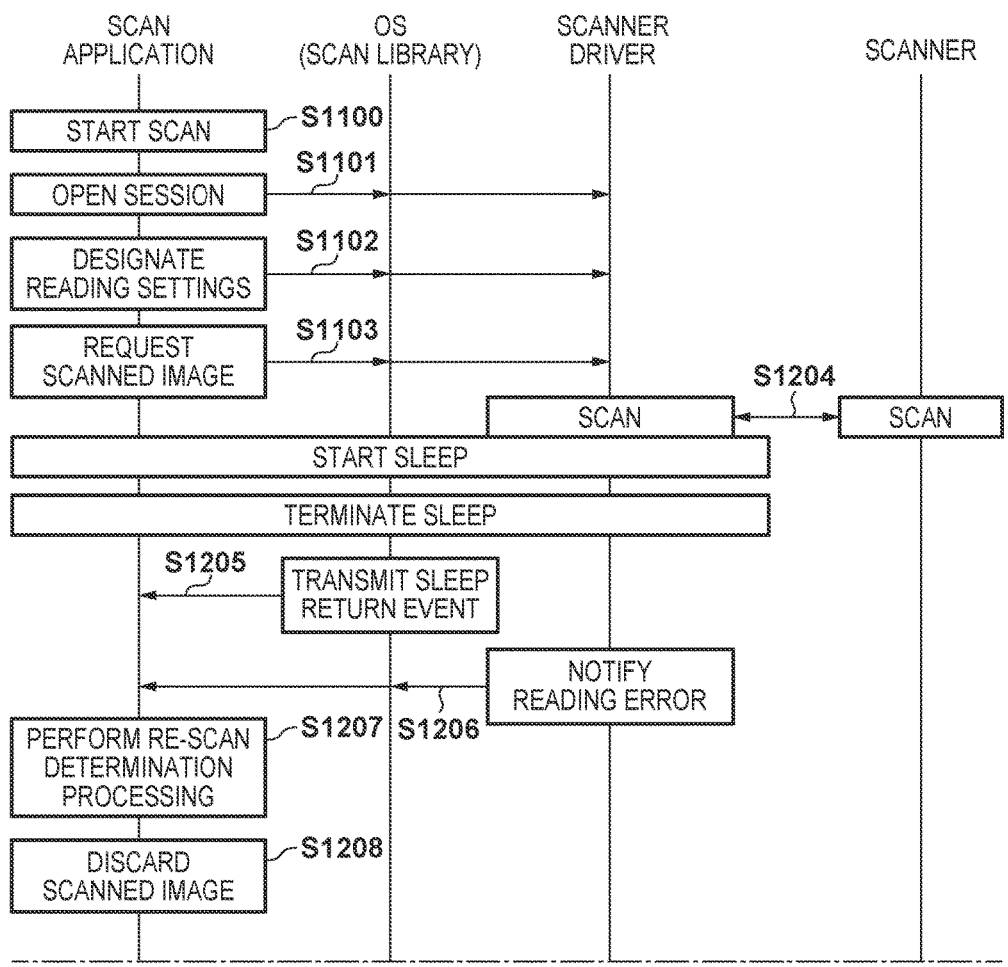

FIGS. 12A and 12B are sequence charts each showing processing when the computer 20 shifts to a sleep state while the scan application is obtaining image data based on an original reading operation and the original reading operation is automatically restarted after the computer 20 returns from the sleep state. Note that the same step numbers as those described with reference to FIG. 11 denote the same processing steps in FIGS. 12A and 12B, and a description thereof will be omitted.

Assume that after the processes of steps S1100 to S1103, the computer 20 has shifted to the sleep state while the scanner driver 50 and the scanner 10 are in the middle of scan processing (in the middle of a reading operation) in step S1204. Since power supply to the scanner 10 from the computer 20 stops when the computer shifts to such a state, it becomes a situation where the scanner driver 50 cannot control the scanner 10.

Subsequently, when the computer 20 returns from the sleep state and shifts to a normal activation state, the CPU 25 transmits a sleep return event to the active scan application 40 by using the OS 30 in step S1205. In response, in step S1206, upon returning from the sleep state, the CPU 25 uses the scanner driver 50 to notify the scan application 40 that a reading error has occurred. In step S1207, the CPU 25 uses the scan application 40 to receive the sleep return event from the OS 30 and the reading error occurrence notification. Upon confirming the notification of steps S1206 to S1207, the CPU 25 discards the image data of the page in which an error was determined to have occurred in step S1208.

Then in step S1209, the CPU 25 closes the session established in step S1101 by using the scan application 40. The CPU 25 further opens the session of the device to read the image data of the page in which an error occurred again in step S1210. Afterwards, in step S1211, the CPU 25 uses the scan application 40 to designate information indicating the necessity of initialization to the scanner driver 50 by using a custom message or custom capability in accordance with a predetermined image communication specification. Then, the scanner driver 50 is notified of this information. In response, in step S1212, the CPU 25 initializes the scanner control module 53 of the scanner driver 50, and the scanner control module 53 directly controls the controller of the scanner 10 to initialize the scanner 10. By this initialization, the scanner 10 executes moving processing to the home position of an original reading unit or the like as the termination processing of the previously interrupted reading operation and completes the preparation for a new original reading operation.

The subsequent steps S1102 to S1108 are the same as those described in FIG. 11, and a description thereof will be omitted.

Note that although device initialization in step S1212 tries to perform synchronous processing in accordance with the designation of initialization information by the scan application 40 in step S1211, the processing can be asynchronous processing and be executed as pre-processing of step S1104.

Therefore, according to the above-described second embodiment, even in a case where the scanner is a USB-powered device and operated by power supply from the computer, the scanner can be initialized after returning from a sleep state by the instruction of the scan application. This initialization is implemented when the CPU 25 receives a sleep return event and a reading error occurrence notification, and executes the designation of initialization information (step S1211) by using the scan application 40. Since the reading processing which was operating before the shift to the sleep state is automatically continued without an error termination even if the scan application of the computer returns from the sleep state during an original reading operation by the scanner, user convenience can be improved.

Third Embodiment

In the second embodiment, the scan application 40 includes the sleep event detection module, and the CPU 25 uses the scan application 40 to designate the initialization information to the scanner driver 50 after the computer 20 returned from the sleep state. On the other hand, the third embodiment has an arrangement in which a scanner driver 50 is provided with a sleep event detection module and initialization of a scanner 10 is performed without using a scan application 40. An example in which a scanner 10 is a USB-powered device and operated by power supply from a computer 20 in an information processing system including the computer 20 and the scanner 10 connected via a USB interface according to the third embodiment will be described.

Figure 13A:
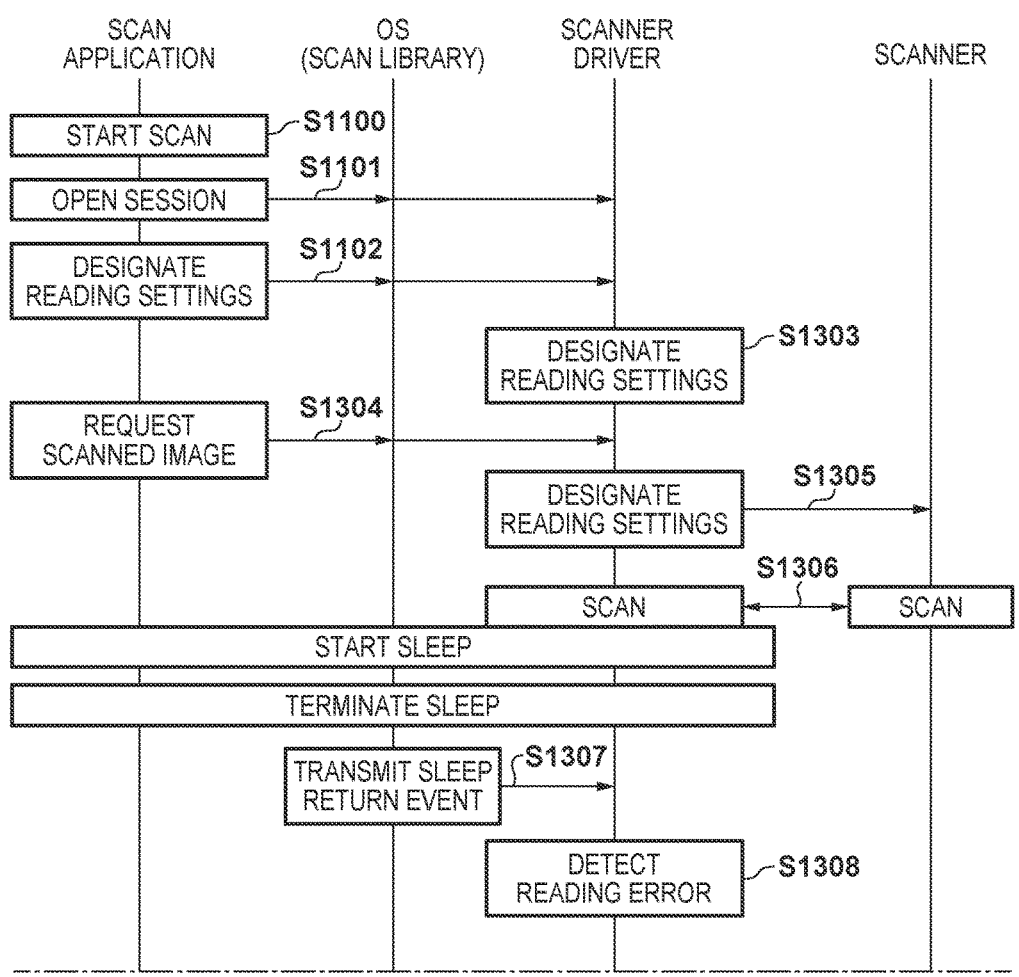

FIGS. 13A to 13B are sequence charts each showing how a CPU 25 uses the scanner driver to automatically restart the scan processing after the computer 20 has shifted to a sleep state while scanned images are being obtained. Note that the same step numbers as those described with reference to FIG. 11 denote the same processing steps in FIGS. 13A and 13B, and a description thereof will be omitted.

Assume that after the processes of steps S1100 to S1102, the CPU 25 holds, in a memory, the reading settings designated from the scan application 40 by using the scanner driver 50 in step S1303. Then in step S1304, the CPU 25 uses the scan application 40 to request the scanned images. The CPU 25 uses the scanner driver 50 to designate the reading settings in step S1305 and then performs scan processing to read out image data in step S1306.

When the computer 20 shifts to a sleep state during the scan processing in step S1306, power supply to the scanner 10 is stopped. Therefore, the third embodiment will assume a situation where the CPU 25 cannot control the scanner 10 by using the scanner 50.

In this situation, when the computer 20 returns from the sleep state to a normal activation state, the CPU 25 uses an OS 30 to transmit a sleep return event to the active scanner driver 50 in step S1307. The CPU 25 will fail to access the scanner 10 by using the scanner driver 50 after returning from the sleep state. Therefore, in response to receiving the sleep return event from the OS 30, the CPU 25 uses the scanner driver to detect a reading error in step S1308. In step S1309, in response to receiving the sleep return event and detecting the reading error, the CPU 25 determines to execute a re-scan operation by using the scanner driver 50. Then, in step S1310, the CPU 25 discards the image data of the page in which the error occurred.

Next, in step S1311, the CPU 25 uses the scanner driver 50 to initialize a scanner control module 53, and the scanner control module 53 directly controls the controller of the scanner 10 to initialize the device. From this initialization, the scanner 10 executes moving processing to the home position of an original reading unit or the like as the termination processing of the interrupted previous reading operation and completes the preparation for a new original reading operation. In step S1312, the CPU 25 uses the scanner driver 50 to designate the reading settings which were held in step S1303.

Note that the device initialization in step S1311 can be executed before discarding the scanned images in step S1310 or executed in parallel as a separate thread.

Since the subsequent steps S1104 to S1108 are the same as those described in FIG. 11, a description thereof will be omitted.

Therefore, according to the above-described third embodiment, since no error termination occurs even if the scan application of the computer returns from the sleep state while the scanner is reading an original and the reading processing which was operating before the shift to the sleep state can automatically continue, user convenience can be improved.

Conventionally, in a case where a series of read image data is generated as a single multi-page file, it was necessary to plug off and in the USB cable for the scanner initialization after the computer returned from the sleep state. According to the third embodiment, however, the scanner can be initialized without having to plug off and in the USB cable.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-063369, filed Mar. 25, 2015, which is hereby incorporated by reference herein in its entirety.

What is claimed is:

1. An information processing apparatus that can operate in a power-saving mode and supplies power to
    an image reading device configured to read an image from an original, comprising;
        a request unit configured to request a reading operation to the image reading device;
        a discarding unit configured to, in a case where the reading operation does not terminate normally due to the fact that the information processing apparatus changes to the power-saving mode during the reading operation, discard image data of an image which was being read from an original when the information processing apparatus changed to the power-saving mode after the information processing apparatus returns from the power-saving mode;
        an initialization unit configured to initialize the image reading device between a start of the reading operation and re-reading of the image corresponding to the discarded image data, in the case where the reading operation does not terminate normally; and
        an instruction unit configured to instruct the image reading device to re-read the image corresponding to the discarded image data after the image reading device has been initialized, wherein the request unit, the discarding unit, the initialization unit, and the instruction unit are implemented by a processor and a memory.

2. The apparatus according to claim 1, further comprising a display that displays a message indicating that communication with the image reading device is disabled.

3. The apparatus according to claim 1, further comprising a confirmation unit configured to confirm the return from the power-saving mode, based on a return event from an operating system operating in the information processing apparatus,
wherein the confirmation unit is implemented by the processor and the memory.

4. The apparatus according to claim 1, further comprising a setting unit configured to set a reading condition of the image in the image reading device,
wherein the instruction unit instructs the image reading device to perform the reading operation, based on the reading condition set by the setting unit, and the setting unit is implemented by the processor and the memory.

5. The apparatus according to claim 4, wherein the instruction unit instructs the image reading device to perform re-reading of the image which was being read from the original, based on the reading condition set by the setting unit.

6. The apparatus according to claim 1, wherein the information processing apparatus connects to the image reading device by a USB interface, and
wherein the image reading device is a USB-powered device to which power is supplied via the USB interface.

7. The apparatus according to claim 1, further comprising a generation unit configured to generate a single multi-page image file by continuously reading a plurality of originals,
wherein the generation unit is implemented by the processor and the memory.

8. The apparatus according to claim 1, further comprising a display that displays a message notifying a user of re-reading of the image,
wherein the display further displays a message prompting one of reading another original and terminating the reading operation, in a case where the reading operation in the image reading device has been terminated normally.

9. A non-transitory computer readable storage medium which stores a computer program to be executed in a processor of an information processing apparatus that can operate in a power-saving mode and supplies power to
an image reading device configured to read an image from an original, the program causing the information processing apparatus to perform a method comprising:
requesting a reading operation to the image reading device;
receiving image data obtained in the reading operation of the image;
in a case where the reading operation does not terminate normally due to the fact that the information processing apparatus changes to the power-saving mode during the reading operation, discarding the received image data of an image which was being read from an original when the information processing apparatus changed to the power-saving mode after the information processing apparatus returns from the power-saving mode;
initializing the image reading device between a start of the reading operation and re-reading of the image corresponding to the discarded image data, in the case where the reading operation does not terminate normally; and
instructing the image reading device to re-read the image corresponding to the discarded image data after the image reading device has been initialized.

10. An information processing method of an information processing apparatus that can operate in a power-saving mode and supplies power to
an image reading device configured to read an image from an original, comprising:
requesting a reading operation to the image reading device;
receiving image data obtained in the reading operation of the image;
in a case where the reading operation does not terminate normally due to the fact that the information processing apparatus changes to the power-saving mode during the reading operation, discarding the received image data of an image which was being read from an original when the information processing apparatus changed to the power-saving mode after the information processing apparatus returns from the power-saving mode;
initializing the image reading device between a start of the reading operation and re-reading of the image corresponding to the discarded image data, in the case where the reading operation does not terminate normally; and
instructing the image reading device to re-read the image corresponding to the discarded image data after the image reading device has been initialized.

11. The method according to claim 10, further comprising displaying, on a display screen, a message indicating that communication with the image reading device is disabled.

12. The method according to claim 10, further comprising confirming the return from the power-saving mode, based on a return event from an operating system operating in the information processing apparatus.

13. The method according to claim 10, further comprising setting a reading condition of the image in the image reading device,
wherein the image reading device is instructed to perform the reading operation based on the reading condition set in the setting step.

14. The method according to claim 13, wherein in the instructing step, the image reading device is instructed to perform re-reading of the image which was being read from the original, based on the reading condition set by the setting step.

15. The method according to claim 10, further comprising:
displaying a message notifying a user of re-reading of the image; and
further displaying a message prompting one of reading another original and terminating the reading operation, in case where the reading operation in the image reading device has been terminated normally.

* * * * *